United States Patent
Atac et al.

(10) Patent No.: US 12,429,749 B2
(45) Date of Patent: Sep. 30, 2025

(54) METHODS AND SYSTEMS FOR AUTOMATIC PARALLAX COMPENSATION FOR HELMET MOUNTED IMAGING SENSORS USED FOR AUGMENTED OR EXTENDED REALITY DISPLAYS

(71) Applicant: Thales Defense & Security, Inc., Clarksburg, MD (US)

(72) Inventors: Robert Atac, Batavia, IL (US); Richard Madison, Bedford, MA (US)

(73) Assignee: Thales Defense & Security, Inc., Clarksburg, MD (US)

( * ) Notice: Subject to any disclaimer, the term of this patent is extended or adjusted under 35 U.S.C. 154(b) by 130 days.

(21) Appl. No.: 18/301,740

(22) Filed: Apr. 17, 2023

(65) Prior Publication Data

US 2023/0333450 A1 Oct. 19, 2023

Related U.S. Application Data

(60) Provisional application No. 63/332,081, filed on Apr. 18, 2022.

(51) Int. Cl.
  *G03B 13/14* (2021.01)
  *G02B 27/01* (2006.01)

(52) U.S. Cl.
  CPC ........... *G03B 13/14* (2013.01); *G02B 27/017* (2013.01)

(58) Field of Classification Search
  None
  See application file for complete search history.

(56) References Cited

U.S. PATENT DOCUMENTS

| | | | |
|---|---|---|---|
| 6,208,933 B1 * | 3/2001 | Lazar | G01C 21/20 342/63 |
| 8,762,041 B2 * | 6/2014 | Lindner | G01C 21/3605 701/425 |
| 2015/0245016 A1 | 8/2015 | Atac | |
| 2017/0237963 A1 * | 8/2017 | Cook | H04N 13/271 348/49 |
| 2017/0352190 A1 | 12/2017 | Calloway et al. | |
| 2020/0011668 A1 * | 1/2020 | Derhy | A61B 1/000094 |
| 2020/0134839 A1 | 4/2020 | Sevostianov | |
| 2021/0373336 A1 * | 12/2021 | Price | G02B 27/0172 |

* cited by examiner

*Primary Examiner* — Rodney E Fuller
(74) *Attorney, Agent, or Firm* — ArentFox Schiff LLP

(57) ABSTRACT

A method, medium and system for compensating for parallax in transparent, semi-transparent, or opaque display components of a headband, headgear, head-worn device, or helmet-mounted device. A method for compensating for parallax in an image displayed on a display of a head-worn device (HWD) may include determining locations of one or more landmarks in a geographic space relative to a location of a user of the HWD based on first information indicative of the geographic space; generating a map of the one or more landmarks in the geographic space; receiving second information indicative of the geographic space; orienting the second information indicative of the geographic space relative to the map; shifting at least a portion of first or second information indicative of the geographic space to produce modified image data; and projecting the modified image data onto the screen of the head-worn device.

20 Claims, 7 Drawing Sheets

METHODS AND SYSTEMS FOR AUTOMATIC PARALLAX COMPENSATION FOR HELMET MOUNTED IMAGING SENSORS USED FOR AUGMENTED OR EXTENDED REALITY DISPLAYS

CROSS-REFERENCE TO RELATED APPLICATIONS

This application claims the benefit of U.S. Provisional Application No. 63/332,081, filed Apr. 18, 2022 and hereby incorporates by reference herein the contents of this application.

BACKGROUND

Field

Aspects of the present disclosure relate generally to systems and methods for compensating for parallax in transparent or semi-transparent displays, e.g., as used in head-worn or helmet-mounted displays (HWDs or HMDs). Both HMDs and HWDs are referred to herein as HWDs.

Background

HWDs generally include helmet-mounted imaging sensors and/or cameras mounted on the side or brow of the helmet or on an attachment mechanism to the head of the wearer. These imaging sensors and/or cameras are typically displaced from a user's eyes. Therefore, when an image captured by the sensor and/or camera is projected on a see-through display screen in front of the wearer's eyes, there is typically some parallax between the image from the sensor and the outside surroundings as seen by the user. This typically results in the user seeing double or triple images of the same object. Generally, double or triple images are only visible for objects within approximately 20 meters of the user.

There remains an unmet need for an efficient method and system that compensates for parallax in transparent displays.

SUMMARY

In light of the above described problems and unmet needs, as well as others, aspects of the design, development, and testing of a system and method for compensating for parallax in transparent or partially transparent displays is described herein. Among other things, these aspects may be used for, e.g., augmented or extended reality displays, night vision HWDs, and infrared (IR) HWDs used to visualize nearby objects (e.g., by a dismounted soldier).

In an aspect of the disclosure, a method, a computer-readable medium, and a system for compensating for parallax in transparent or semi-transparent displays are provided. The method, medium and system may provide for compensating for parallax in transparent or semi-transparent display components of a headband, headgear, head-worn device, or helmet-mounted device.

In some aspects, a method for compensating for parallax in an image displayed on a display of a head-worn device (HWD) may include determining locations of one or more landmarks in a geographic space relative to a location of a user of the HWD based on first information indicative of the geographic space; generating a map of the one or more landmarks in the geographic space; receiving second information indicative of the geographic space; orienting the second information indicative of the geographic space relative to the map; shifting at least a portion of second information indicative of the geographic space to produce modified image data; and projecting the modified image data onto the screen of the head-worn device. In some aspects, the map may include distance data of the one or more landmarks and the shifting may be based on the distance data of the one or more landmarks. In some aspects, the second information may be determined by a detector mounted above the display. The modified image data may be configured to overlie the geographic space as viewed by the user through the display. In some aspects, the second information may be determined by a night vision camera. In some aspects, the second information may be determined by an infrared sensor. In some aspects, the modified image data may correspond to a portion of the geographic space within 30 meters or less from a user of the head-worn device. In some aspects, the first information may be determined by an optical-inertial tracker.

In some aspects, a system for compensating for parallax in an image displayed on a display of a head-worn device may include a first detector, a second detector, a display, and a computing system including a processor and a memory. The first detector may be configured to determine first information indicative of a geographic space. The second detector may be configured to determine second information indicative of a geographic space. The memory may include instructions executable by the processor to: determine locations of one or more landmarks in a geographic space relative to a location of a user of the HWD based on the first information indicative of the geographic space; generate a map of the one or more landmarks in the geographic space; orient the second information indicative of the geographic space relative to the map; shift at least a portion of second information indicative of the geographic space to produce modified image data; and project the modified image data onto the display. In some aspects, the map may include distance data of the one or more landmarks and the shifting may be based on the distance data of the one or more landmarks. In some aspects, the second detector may be mounted above the display. The modified image data may be configured to overlie the geographic space as viewed by the user through the display. In some aspects, the second detector may be or include a night vision camera. In some aspects, the second detector may be or include an infrared sensor. In some aspects, the modified image data may correspond to a portion of the geographic space within 30 meters or less from a user of the head-worn device. In some aspects, the first sensor may be or include an optical-inertial tracker.

A method for compensating for parallax in an image displayed on a display of a head-worn device (HWD) may include determining locations of one or more landmarks in a geographic space relative to a location of a user of the HWD based on first information indicative of the geographic space determined by a detector; generating a map of the one or more landmarks in the geographic space; shifting at least a portion of first information indicative of the geographic space determined by the detector to produce modified image data; and projecting the modified image data onto the screen of the head-worn device.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Various example aspects of the systems and methods will be described in detail, with reference to the following figures, wherein.

DETAILED DESCRIPTION

Figure 1:
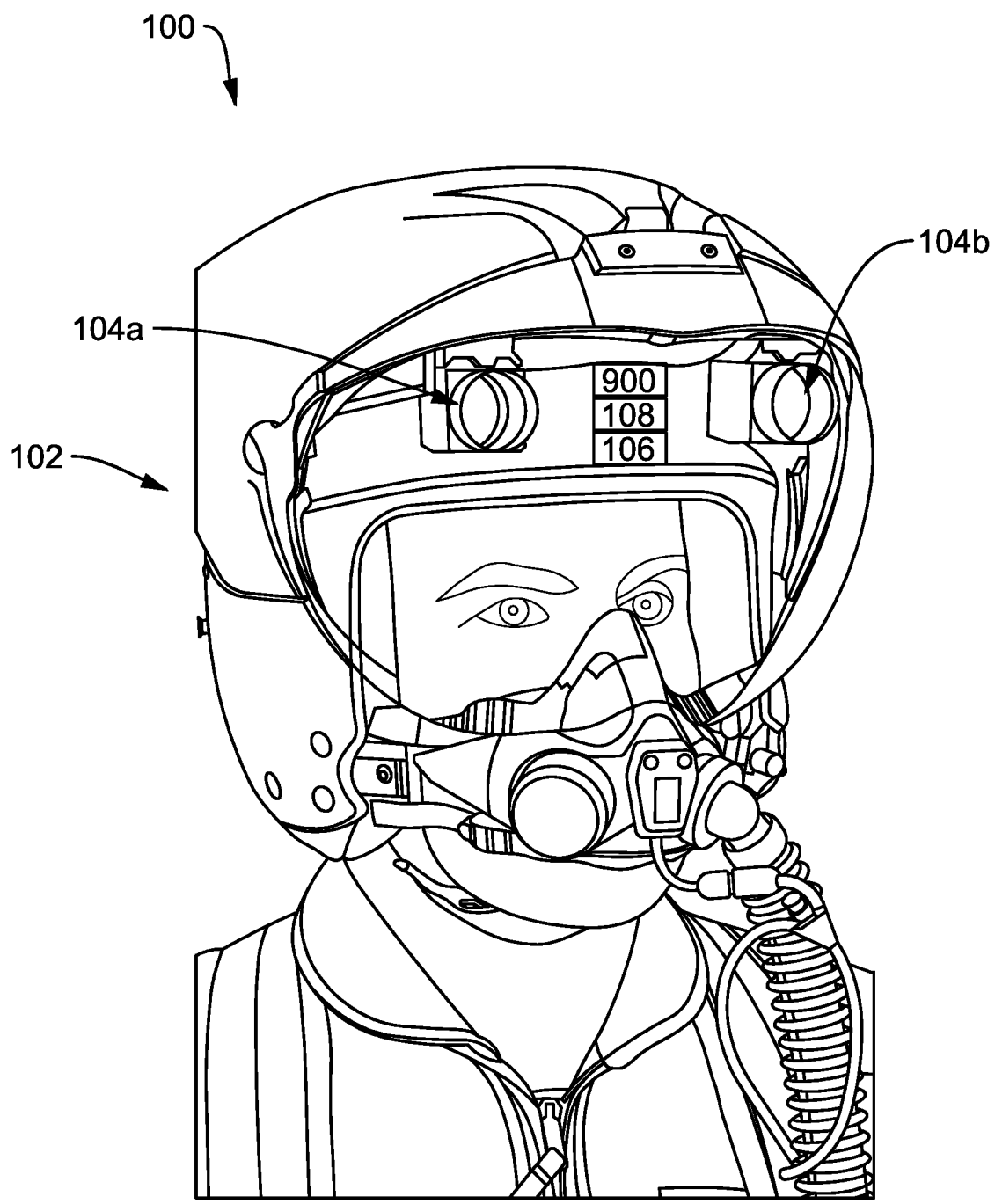
FIG. 1 is a diagram illustrating an example system for compensating for parallax in transparent or semi-transparent displays, in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of parallax reduction systems will now be presented with reference to various apparatuses and methods. These apparatuses and methods will be described in the following detailed description and illustrated in the accompanying drawings by various blocks, components, circuits, steps, processes, algorithms, etc. (collectively referred to as "elements"). These elements may be implemented, for example, using electronic hardware, computer software, or any combination thereof, or any other means of implementing these elements. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above are also included within the scope of computer-readable media.

Accordingly, in one or more aspects, the functions described below may be implemented in any one of a Helmet-Mounted Display ("HMD"), or a Head-Worn Display ("HWD"). Both HMDs and HWDs are interchangeably referred to herein as HWDs.

In some aspects, HWDs may include transparent or partially transparent display screens to provide augmented reality displays to a user (interchangeably referred to herein as a wearer) of the HWD. In such aspects, images captured by an image sensor and/or a camera mounted on the HWD may be projected onto the transparent display so that they overlay the user's view of the environment. For example, in some aspects, the camera may be a digital night vision camera, and images captured by the digital night vision camera may be projected onto the display. In other aspects, the HWD may include opaque display screens. In some aspects, the camera may be an IR camera or sensor, and thermal images may be projected onto the display.

However, such optical sensors, thermal sensors, and/or cameras typically may be mounted on the side or brow of the helmet or on an attachment mechanism to the head of the wearer. Thus, these imaging sensors and/or cameras are typically displaced from a user's eyes. When objects positioned relatively far from a user are captured by the optical sensor, thermal sensor, and/or cameras and images of the objects are projected onto the display, the projected images of the objects typically align with the objects in the outside surroundings as seen by the user through the display. However, when objects relatively close to the user are captured by the optical sensor, thermal sensor, and/or cameras and images of the objects are projected onto the display, the projected images of the objects may be displaced relative to the actual objects in the outside surroundings as seen by the user through the display because of parallax between the image from the sensor and the outside scene as seen by the user (e.g., since the camera(s) capturing the image data are not aligned with the user's eyes). As used herein, the term "parallax" refers to a displacement or difference in the apparent position of an object viewed along two different lines of sight. The amount of parallax can be measured by the angle or semi-angle of inclination between the two lines of sight. Parallax is typically larger for nearby objects than for farther objects.

Further, the overlapping portions of image data captured by more than one camera are typically not converged (e.g., the lines of sight of the cameras are parallel). While the configuration of optical sensors, thermal sensors, and/or cameras mounted on the HWDs with transparent or partially transparent display screens to provide augmented reality displays to a wearer of the HWD may work for objects greater than 100 ft (30 meters) from the wearer, the configuration may produce a double, triple, or misaligned image for the wearer when objects are closer than 100 ft (30 meters).

Thus, both parallax and lack of convergence can result in the user/wearer seeing double or triple images of the same object. Typically, parallax is noticeable to a user for objects within approximately 20 meters of the user. Users/wearers such as dismounted soldiers are typically focused on objects and environmental features between 6 feet (1.8 meters) and 10 feet (3 meters) away from them, so it is desirable to modify the projected images to more closely align with the objects and environmental features in the outside surroundings as seen by the user, and to remove the duplicate images of the same object/feature that may occur due to parallax.

For example, when a user views an object closer than 100 ft (30 meters) using the binocular HWD 102, the user's eyes may begin to converge. However, the cameras do not generally converge, so the user may see three versions of close objects/features (e.g., the converged image produced by the user's eyes and a version from each camera). Typically, a user's environment may include multiple objects at different distances. It is difficult to predict (e.g., via a computer system 900 illustrated in FIG. 4 and further described below) which object or objects in the outside surroundings the user is viewing, so it would be beneficial to be able to adapt nearby images to compensate the projected images for parallax and/or for the user's eye convergence.

Referring to FIG. 1, illustrated is a representative diagram of various features of an example parallax-compensating display system 100 according to an aspect of the present disclosure. In some aspects, the system 100 may include a single display system 102 with portions configured to display images to the right eye and the left eye of the user. In other aspects, the display system 102 may include dual displays positioned for a right eye and a left eye of a user, respectively. In one aspect of the disclosure, the display system 102 may project images onto a display that is see-through (interchangeably referred to herein as transparent) or partially see-through, such that the user can see the outside surroundings through the display system 102 while also seeing images projected onto the display system 102 in an augmented-reality application. For example, the user may be able to see the outside surroundings through the display system 102 while also seeing images captured by a night vision camera and/or an infrared (IR) sensor that are projected onto the display system 102, as described in greater detail below. In other aspects of the disclosure, the display system 102 may project images onto a display that is opaque.

The display system 102 may contain and/or be coupled to one or more digital cameras, such as the digital camera 104a and/or the digital camera 104b. In some aspects, the digital cameras 104a, 104b may be digital night vision cameras. In some aspects, such as the system illustrated in FIG. 1, the digital cameras 104a, 104b may be positioned above the display system 102. The digital cameras 104a, 104b may also be laterally displaced relative to the user's eyes when the user is wearing the HWD.

The display system 102 may contain or be coupled to an infrared (IR) sensor 106. In some aspects, such as the system illustrated in FIG. 1, the IR sensor 106 may be positioned above the display system 102. The IR sensor 106 may also be laterally displaced relative to the user's eyes when the user is wearing the HWD.

The display system 102 may also include and/or be coupled to an inertial measurement unit (IMU) or tracker 108. In some aspects, the tracker 108, may include, for example, an IS-1500® Natural Features tracker produced by Thales Visionix® of Clarksburg, MD.

The digital cameras 104a, 104b, the IR sensor 106, and the tracker 108 are interchangeably referred to herein as detectors.

In one example implementation, in accordance with aspects of the disclosure, the display system 102, the digital cameras 104a, 104b, the tracker 108, and a computing system 900 (illustrated in FIG. 4 and further described below) may be electrically coupled via wired connections. Computing system 900 may be coupled to (e.g., mounted on) the HWD or may be remote from the HWD. In one example implementation, the display system 102, the digital cameras 104a, 104b, the tracker 108, and the computing system 900 may be configured to communicate over a wireless communications network. Alternatively to the electrical connections described above with reference in FIG. 1, in some implementations, the various components may be wirelessly, optically, or otherwise coupled to one another.

Figure 2:
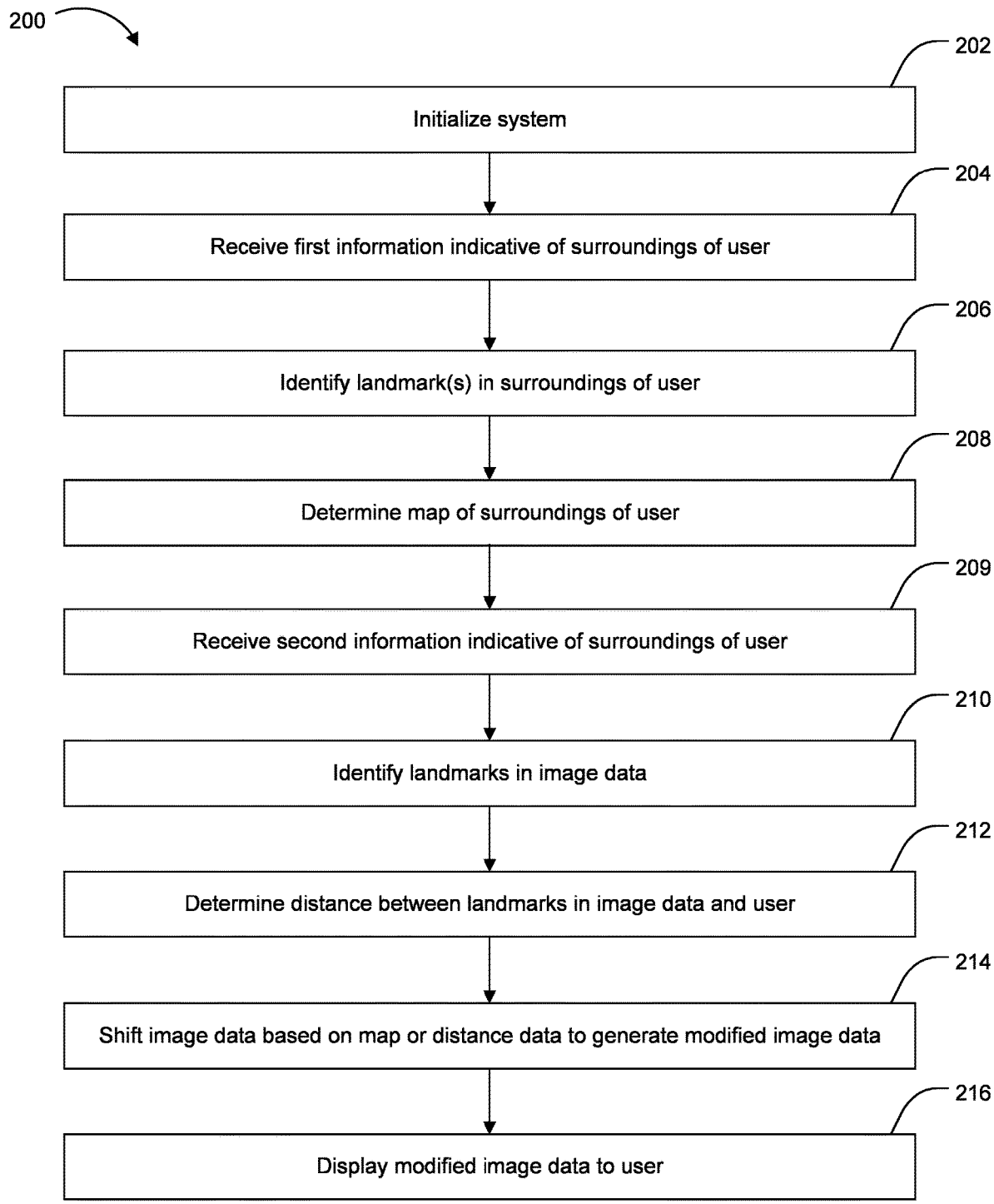
FIG. 2 is an example flowchart for a method for compensating for parallax in transparent or semi-transparent displays, in accordance with aspects of the present disclosure.

Referring now to FIG. 2, therein shown is an example flowchart for a method 200 for compensating for parallax in transparent or semi-transparent displays, in accordance with aspects of the present disclosure. In some aspects, the method 200 may also be carried out in opaque displays.

At block 202, the method 200 may include initializing the system (e.g., system 100 of FIG. 1). The initialization process may include the powering up of the system, for example, initiating communication with one or more wireless systems (e.g., computer systems at a base station or in a vehicle, communication with other nearby HWDs, and so forth).

At block 204, the method 200 may include receiving, via the cameras 104a, 104b, 106, and/or the tracker 108, first information indicative of a geographic space, such as the outside surroundings of the user. For example, the cameras 104a, 104b may capture (e.g., determine) image data of the outside surroundings of the user. The tracker 108 may determine optical and inertia data indicative of objects or features in the outside surroundings of the user. The IR sensor 106 may determine heat data of the outside surroundings of the user.

At block 206, the method 200 may include identifying one or more landmarks 304 (FIG. 3) in the outside surroundings of the user. The landmarks 304 may be selected from one or more of the fixed objects in the outside surroundings of the user. In some aspects, the computing system 900 may select objects with fixed positions that are within a predefined distance threshold as landmarks 304. For example, parallax is most prominent for objects within approximately 20 meters (approximately 66 ft) of the user. In such aspects, the predefined distance threshold may be 20 meters. In some aspects, the predefined threshold may be 10 meters. In some aspects, the predefined threshold may be 3 meters, or another distance that is desirable/appropriate. In some aspects, the method 200 may identify a plurality of landmarks at block 206. Each of the identified landmarks 304 may be at different distances from the user. In some aspects, the tracker 108 or the computing system 900 may designate fixed objects likely to be of interest to the user as landmarks 304. For example, the tracker 108 or the computing system 900 may use an object-recognition database to identify fixed objects or features that are likely to be of interest to the user.

At block 208, the method 200 may include developing a map 300 of the outside surroundings of the user based on the landmarks 304. For example, the block 208 may include determining, based on the data received from the tracker 108, distances between the user and the objects in the outside surroundings of the user. The computing system 900 may then create a three-dimensional surface 302 including the plurality of landmarks 304 identified in block 208. The computing system 900 may position the landmarks 304 in the map 300 based on the determined positions of the landmarks 304 in the outside surroundings of the user.

At block 209, the method 200 may include receiving, via the cameras 104a, 104b, 106, and/or the tracker 108, second information indicative of a geographic space, such as the outside surroundings of the user.

At block 210, the method 200 may include identifying landmarks in the second information indicative of the geographic space, such as image data determined by the cameras 104a, 104b that correspond to each of the landmarks 304 identified from the data determined by the tracker 108 (and that are included in the map 300).

At block 212, the method 200 may include determining distances between the user and the landmarks identified from data determined from the cameras 104a, 104b based on the known distances of the landmarks 304 of the map 300.

At block 214, the method 200 may include shifting, based on the distance data and/or the map 300, the image data determined by the cameras 104a, 104b to produce modified image data configured to overlie the objects of the outside surroundings as seen by the user through the display system 102. For example, the image data determined by the cameras 104a, 104b may be shifted by a distance that an object at a particular pixel's assigned distance from the cameras 104a, 104b would appear to move if the cameras 104a, 104b moved from their actual position to the position of the user's eyes.

Shifting the image data may include one or more of shifting the data in a direction substantially parallel to the ground and shifting the data in a direction substantially perpendicular to the ground. In some aspects, the image data of the landmarks identified from data determined by the cameras 104a, 104b corresponding to the landmarks 304 is shifted to produce the modified image data. In such an aspect, the shifting may include assigning the distance data of the landmarks 304 to the distance data of the landmarks identified from data determined by the cameras 104a, 104b. This assigning may be done for the pixels defining the landmarks identified from data determined by the cameras 104a, 104b. In other aspects, both the image data corresponding to the landmarks 304 and other image data, such as image data that is detectable and trackable by the human eye may be modified to produce the modified image data. In such aspects, image data corresponding to landmarks identified from data determined by the cameras 104a, 104b near the landmarks 304 may be shifted based on the distance data for the closest landmarks 304, for example by interpolating the distance data for the closest landmarks 304. Image data that is less detectable, trackable and/or distinct, such as image data corresponding to outside surroundings that are far from the user, may not be not modified.

In some aspects, block 214 may include producing a different set of modified image data for projection onto a portion of the display system 102 visible to the left eye and a portion of the display system 102 visible to the right eye. In some aspects, the display system 102 may include a binocular display in which there are separate displays for the left eye and the right eye. In such aspects, block 214 may include producing a first set of modified image data for projection onto a display for the left eye and may include producing a second set of modified image data for projection onto a for the right eye. In other aspects, block 214 may produce one set of modified image data for projection onto the single display screen.

At block 216, the method 200 includes displaying the modified image data to the user. For example, block 216 may include projecting the modified image data onto the screen of the display system 102. The modified image data will overlie the outside surroundings as seen by the user, thus removing the parallax in augmented reality situations. For example, in aspects in which the digital cameras 104a, 104b are night vision cameras, the night vision images of the outside surroundings will overlie the outside surroundings as seen by the user through the display system 102.

In some aspects, at block 210, the method may include generating a "symbology overlay" image based that includes symbols indicative of the landmarks and/or other image data. In such aspects, blocks 212-216 may be carried out for the symbology overlay image in the same manner described above with respect to the image data.

Figure 3:
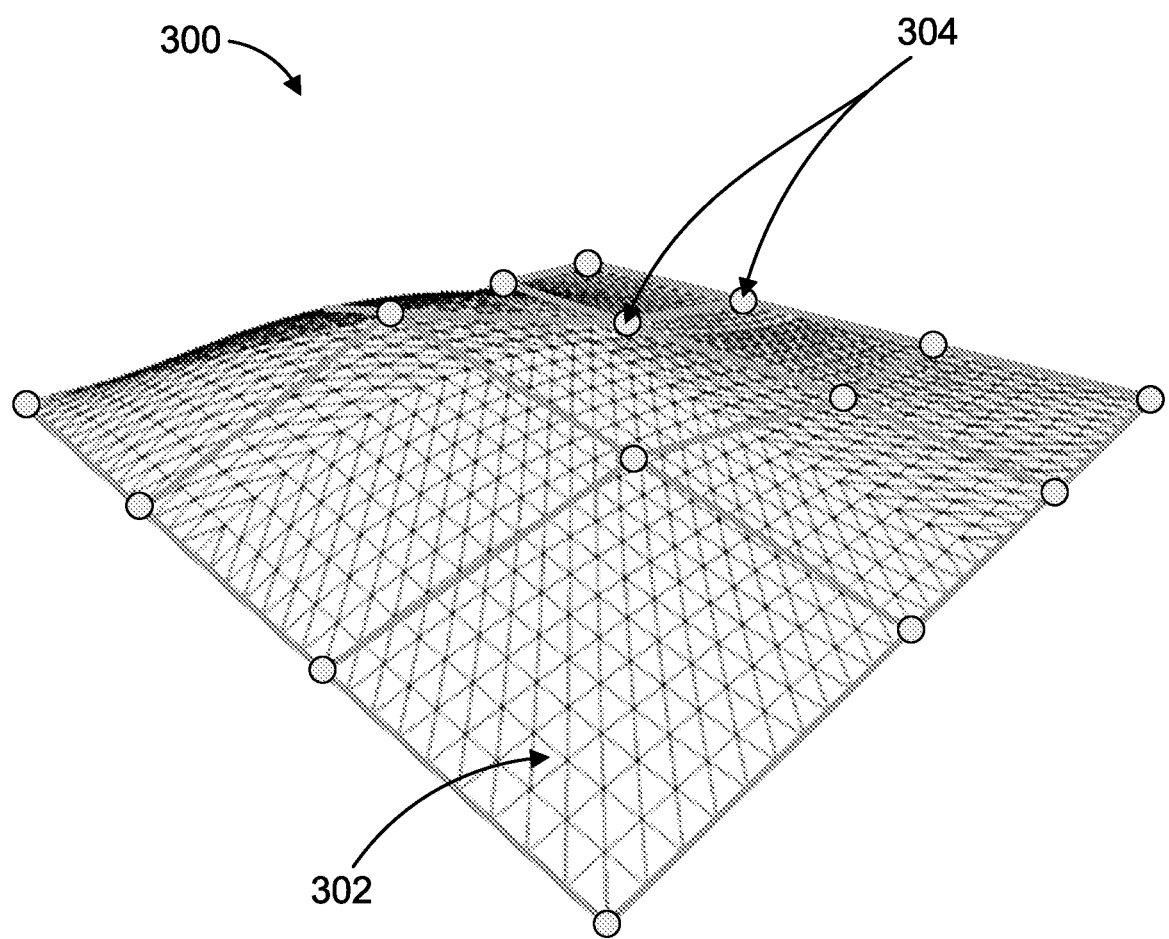
FIG. 3 is a schematic representation of a map of landmarks in a geographic space, in accordance with aspects of the present disclosure.

FIG. 3 presents an example three-dimensional surface map 300 of the outside surroundings of the user that is created during block 208 of the method 300. The map 300 may include landmarks 304 for which distance data is known. The distance data may be distance data between the landmarks 304, or distance data between the landmarks 304 and the user's location, among other distance data. As shown in FIG. 3, the landmarks 304 are sparsely distributed throughout the map 300 (relative to the amount of objects or features in the outside surroundings seen by the user). This relatively sparse map 300 allows the mapping and the image overlay and image processing steps described in blocks 212-214 to be completed with much less computer processing power than an amount of processing power required to shift all of the image data captured by the cameras 104a, 104b. This reduces the amount of time needed for the computing system 900 to process the image data. This also reduces the amount of battery power that the computing system 900 uses to process the image data, improving the battery life of the HWD, if it is battery-operated.

Further, shifting the image data from the cameras 104a, 104b, the IR sensor 106, and/or the optical tracker 108 relative to the landmarks 304 provides for more accurate shifting of image regions that are at different distances from the user, relative to prior art systems that only shift entire images relative to a single point in or near a center of the display.

In some aspects, the user (e.g., wearer) of the helmet may annotate one or more of the objects in the field of view. For example, the user may overlay a symbol, object, word, label, and so forth over an object viewed through the display. The computing system 900 may associate the location of the annotation with the object so that the annotation stays over the object as viewed by the user through the display as the user moves around the environment and/or moves his/her head.

In aspects in which the HWD includes the IR sensor 106, a method 400 may be used to create modified IR data for projection onto the display system 102. In such aspects, thermal images of the outside surroundings will overlie the outside surroundings as seen by the user through the display system 102. In some aspects, method 400 may run in parallel with the method 200.

Figure 4:
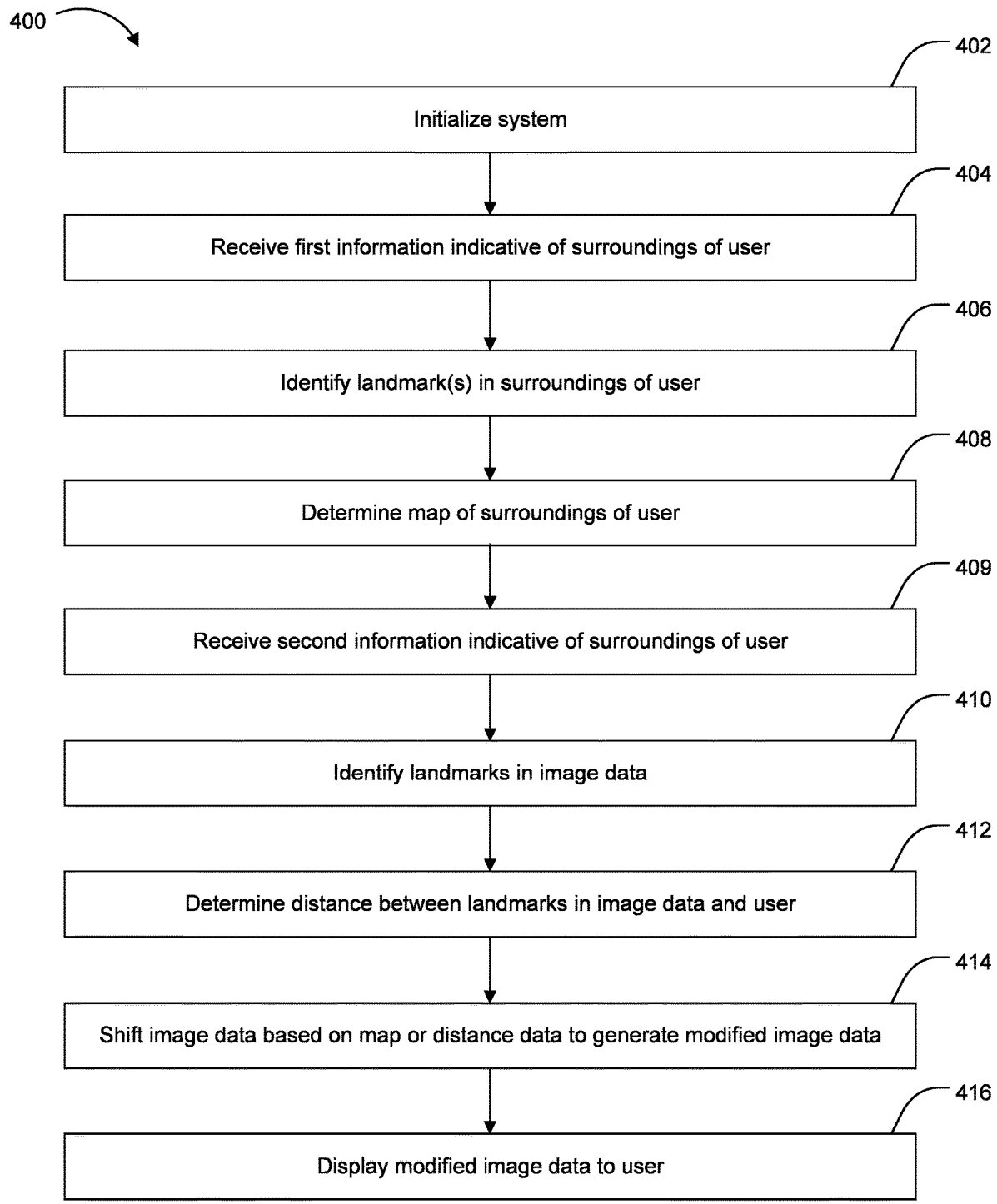
FIG. 4 is an example flowchart for a method for compensating for parallax in transparent or semi-transparent displays, in accordance with aspects of the present disclosure.

For example, referring now to FIG. 4. therein shown is an example flowchart for a method 400 for compensating for parallax in transparent or semi-transparent displays, in accordance with aspects of the present disclosure. In some aspects, the method 400 may also be carried out in opaque displays. The method 400 is referred to in detail herein to the extent that it differs from the method 200. Blocks 402-410 are substantially similar to blocks 202-210, so are not descried in detail herein. In this aspect, the phrases "image data" and "modified image data" include heat data captured by the IR sensor 106.

At block 412, the method 400 may include determining distances between the user and the landmarks identified from heat data determined from the IR sensor 106 based on the known distances of the landmarks 304 of the map 300.

At block 414, the method 400 may include shifting, based on the distance data and/or the map 300, the image data determined by the IR sensor 106 to produce modified image data configured to overlie the objects of the outside surroundings as seen by the user through the display system 102. For example, the image data determined by the IR sensor 106 may be shifted by a distance that an object at a particular pixel's assigned distance from the IR sensor 106 would appear to move if the IR sensor 106 moved from its actual position to the position of the user's eyes.

Shifting the image data may include one or more of shifting the data in a direction substantially parallel to the ground and shifting the data in a direction substantially perpendicular to the ground. In some aspects, the image data of the landmarks identified from data determined by the IR sensor 106 corresponding to the landmarks 304 is shifted to produce the modified image data. In such an aspect, the shifting may include assigning the distance data of the landmarks 304 to the distance data of the landmarks identified from data determined by the IR sensor 106. This assigning may be done for the pixels defining the landmarks identified from data determined by the IR sensor 106. In other aspects, both the image data corresponding to the landmarks 304 and other image data, such as image data that is detectable and trackable by the human eye may be modified to produce the modified image data. In such aspects, image data corresponding to landmarks identified from data determined by the IR sensor 106 near the landmarks 304 may be shifted based on the distance data for the closest landmarks 304, for example by interpolating the distance data for the closest landmarks 304. Image data that is less detectable, trackable and/or distinct, such as image data corresponding to outside surroundings that are far from the user, may not be not modified.

In some aspects, block 414 may include producing a different set of modified image data for projection onto a portion of the display system 102 visible to the left eye and a portion of the display system 102 visible to the right eye. In some aspects, the display system 102 may include a binocular display in which there are separate displays for the left eye and the right eye. In such aspects, block 414 may include producing a first set of modified image data for projection onto a display for the left eye and may include producing a second set of modified image data for projection onto a for the right eye. In other aspects, block 414 may produce one set of modified image data for projection onto the single display screen.

At block 416, the method 400 includes displaying the modified image data to the user. For example, block 416 may include projecting the modified image data onto the screen of the display system 102. The modified image data will overlie the outside surroundings as seen by the user, thus removing the parallax in augmented reality situations. For example, heat images of the outside surroundings determined by the IR sensor 106 will overlie the outside surroundings as seen by the user through the display system 102.

In aspects in which the HWD includes the tracker 108, a method 500 may be used to create modified tracker data for projection onto the display system 102. In such aspects, data captured by the tracker 108 of the outside surroundings will overlie the outside surroundings as seen by the user through the display system 102. In some aspects, method 500 may run in parallel with the method 200 and/or the method 400.

Figure 5:
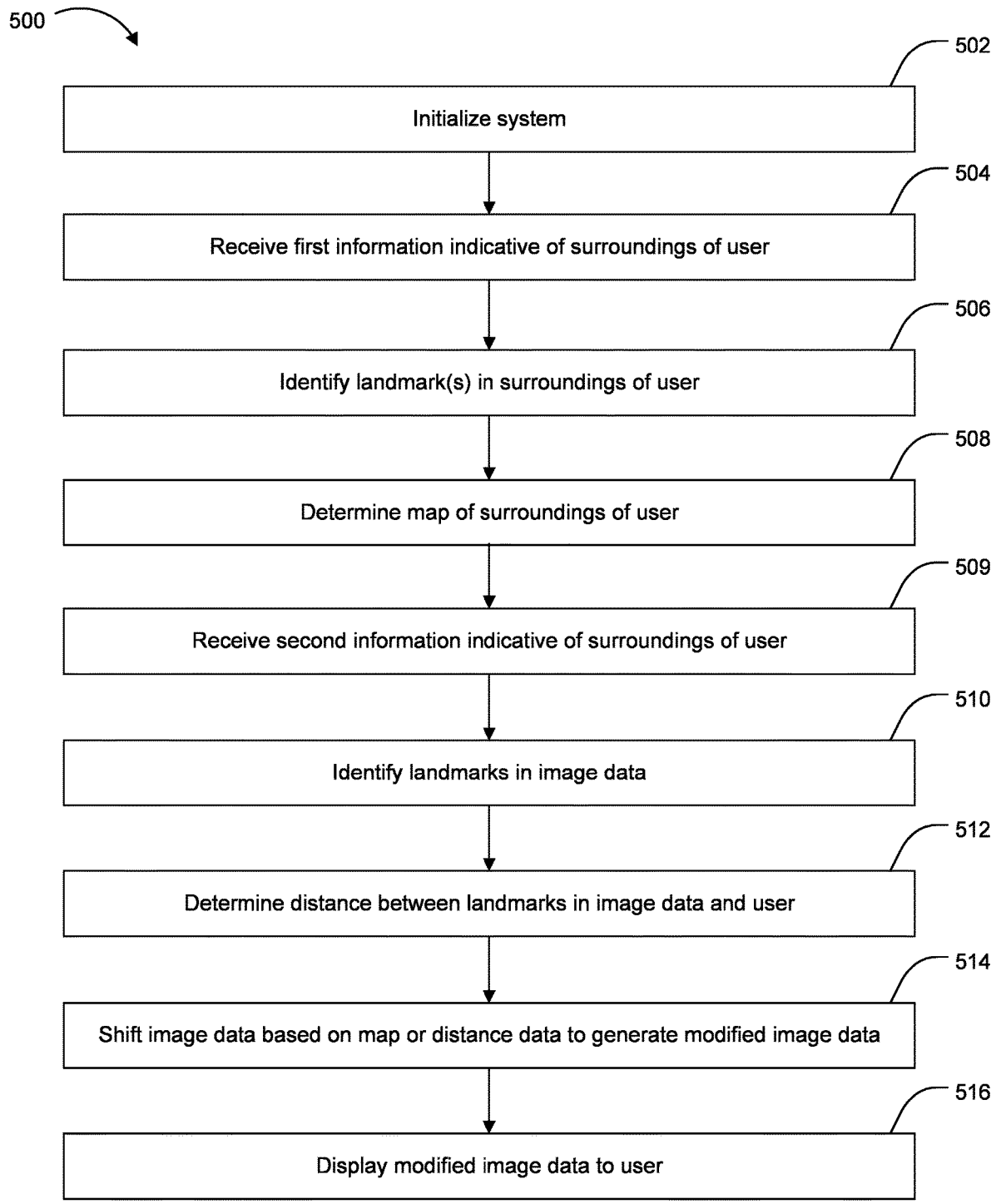
FIG. 5 is an example flowchart for a method for compensating for parallax in transparent or semi-transparent displays, in accordance with aspects of the present disclosure.

For example, referring now to FIG. 5. therein shown is an example flowchart for a method 500 for compensating for parallax in transparent or semi-transparent displays, in accordance with aspects of the present disclosure. In some aspects, the method 500 may also be carried out in opaque displays. The method 500 is referred to in detail herein to the extent that it differs from the method 200. Blocks 502-510 are substantially similar to blocks 202-210, so are not descried in detail herein. In this aspect, the phrases "image data" and "modified image data" include data determined by the tracker 108. In some aspects, the tracker 108 may be an optical-inertial tracker. In some aspects, the optical portion of the tracker may be a night vision camera or otherwise adapted to for night vision. In such aspects, after the map is made during block 508, blocks 509, 510, and 512 may be skipped.

At block 512, the method 500 may include determining distances between the user and the landmarks identified from data determined from the tracker 108 based on the known distances of the landmarks 304 of the map 300.

At block 514, the method 500 may include shifting, based on the distance data and/or the map 300, the image data determined by the tracker 108 to produce modified image data configured to overlie the objects of the outside surroundings as seen by the user through the display system 102. For example, the image data determined by the tracker 108 may be shifted by a distance that an object at a particular pixel's assigned distance from the tracker 108 would appear to move if the tracker 108 moved from its actual position to the position of the user's eyes.

Shifting the image data may include one or more of shifting the data in a direction substantially parallel to the ground and shifting the data in a direction substantially perpendicular to the ground. In some aspects, the image data of the landmarks identified from data determined by the tracker 108 corresponding to the landmarks 304 is shifted to produce the modified image data. In such an aspect, the shifting may include assigning the distance data of the landmarks 304 to the distance data of the landmarks identified from data determined by the tracker 108. This assigning may be done for the pixels defining the landmarks identified from data determined by the tracker 108. In other aspects, both the image data corresponding to the landmarks 304 and other image data, such as image data that is detectable and trackable by the human eye may be modified to produce the modified image data. In such aspects, image data corresponding to landmarks identified from data determined by the tracker 108 near the landmarks 304 may be shifted based on the distance data for the closest landmarks 304, for example by interpolating the distance data for the closest landmarks 304. Image data that is less detectable, trackable and/or distinct, such as image data corresponding to outside surroundings that are far from the user, may not be not modified.

In some aspects, block 514 may include producing a different set of modified image data for projection onto a portion of the display system 102 visible to the left eye and a portion of the display system 102 visible to the right eye. In some aspects, the display system 102 may include a binocular display in which there are separate displays for the left eye and the right eye. In such aspects, block 514 may include producing a first set of modified image data for projection onto a display for the left eye and may include producing a second set of modified image data for projection onto a for the right eye. In other aspects, block 514 may produce one set of modified image data for projection onto the single display screen.

At block 516, the method 500 includes displaying the modified image data to the user. For example, block 516 may include projecting the modified image data onto the screen of the display system 102. The modified image data will overlie the outside surroundings as seen by the user, thus removing the parallax in augmented reality situations. For example, images of the outside surroundings determined by the tracker 108 will overlie the outside surroundings as seen by the user through the display system 102.

Figure 6:
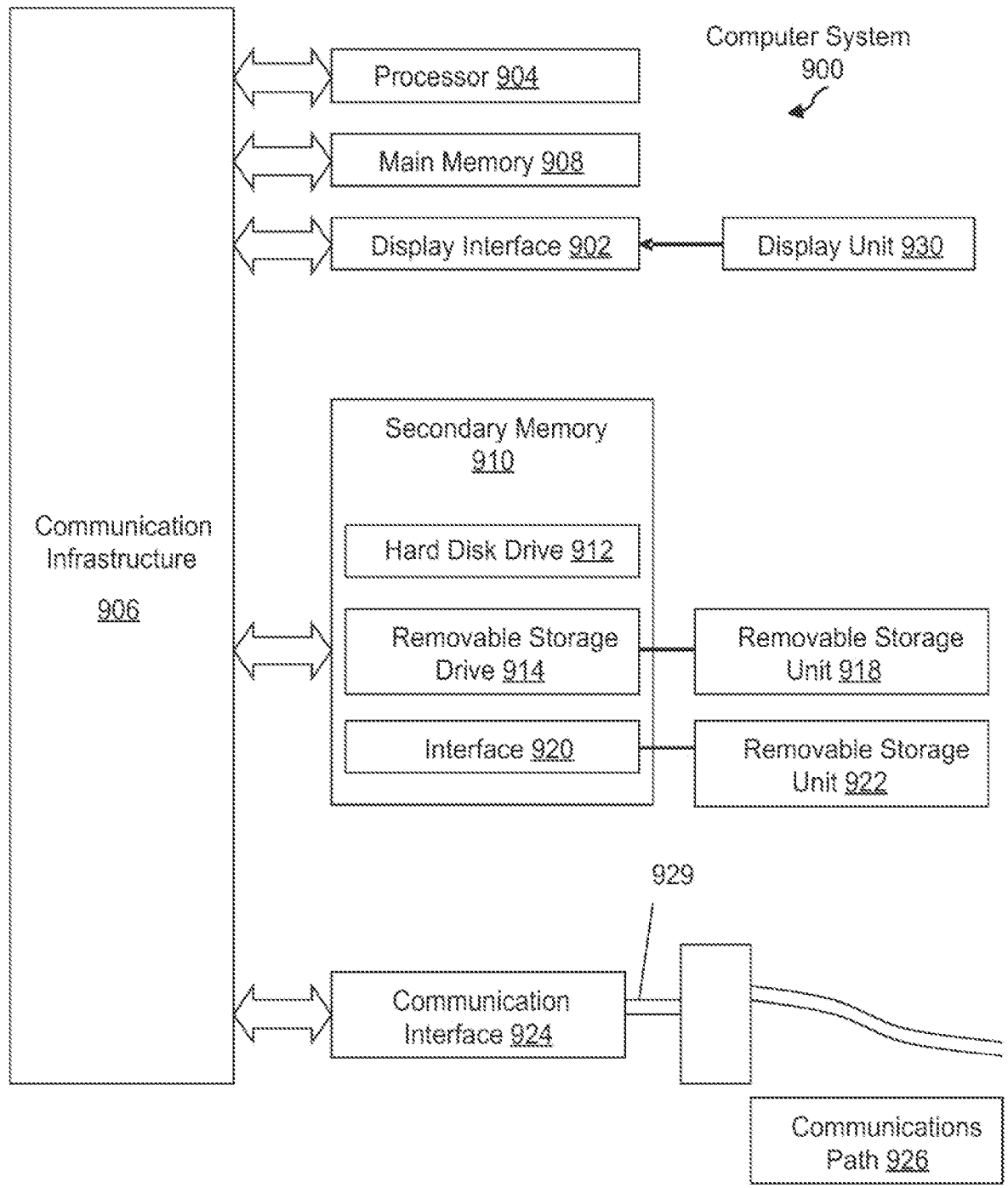
FIG. 6 presents an example system diagram of various hardware components and other features, for use in accordance with aspects of the present disclosure.

FIG. 6 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with one or more of the IMUs, displays, INS, and/or related processing within other components in the helmet of FIGS. 1-5. An example of such a computer system 900 is shown in FIG. 6.

The computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 929, which may be electronic, electromagnetic, optical or other signals capable of being received by communications interface 924. These signals 929 are provided to communications interface 924 via a communications path (e.g., channel) 926. This path 926 carries signals 929 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, the interface 920, and signals 929. These computer program products provide software to the computer system 900. Aspects presented herein may include such computer program products.

Computer programs (also referred to as computer control logic) are stored in main memory 908 and/or secondary memory 910. Computer programs may also be received via communications interface 924. Such computer programs, when executed, enable the computer system 900 to perform the features presented herein, as discussed herein. In particular, the computer programs, when executed, enable the processor 904 to perform the features presented herein. Accordingly, such computer programs represent controllers of the computer system 900.

In aspects implemented using software, the software may be stored in a computer program product and loaded into computer system 900 using removable storage drive 914, hard drive 912, or interface 920 to removable storage unit 922. The control logic (software), when executed by the processor 904, causes the processor 904 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 7:
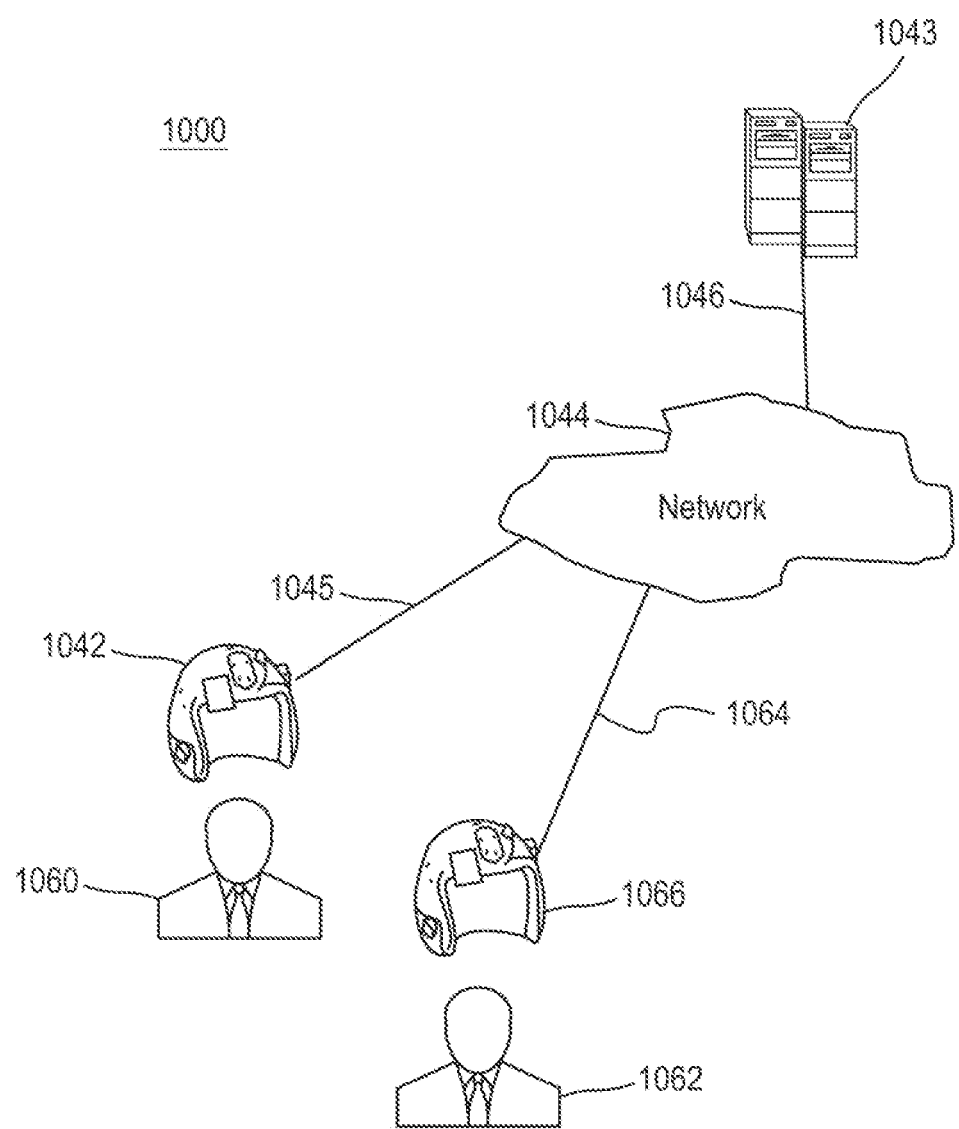
FIG. 7 is a block diagram illustrating various example system components for use in accordance with aspects of the present disclosure.

FIG. 7 illustrates a block diagram of various example system components that may be used in accordance with aspects of the present disclosure. The system 1000 may include one or more accessors 1060, 1062 (also referred to interchangeably herein as one or more "users," such as a soldier) and one or more terminals 1042, 1066 (such terminals may be or include, for example, various features of the IMUs, displays, INS, and/or related processing within other components in the helmet of FIGS. 1-5) within an network. In one aspect, data for use in accordance with aspects of the present disclosure is, for example, input and/or accessed via terminals 1042, 1066, coupled to a server 1043, such as the symbols, IMUs, displays, INS, and/or related processing within other components in the helmet of FIGS. 1-5, and/or other device having a processor and a repository for data and/or connection to a repository for data, via, for example, a network 1044, such as the Internet, an intranet, and/or an aircraft communication system, and couplings 1045, 1046, 1064. It will be recognized by those of ordinary skill in the art that inputting and/or accessing data may be achieved via accessors 1060, 1062 or directly by the terminals, among other means for inputting and/or accessing data. The couplings 1045, 1046, 1064 include, for example, wired, wireless, or fiber optic links. In another example variation, the method and system in accordance with aspects of the present disclosure operate in a stand-alone environment, such as on a single terminal.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example variations, the functions described above may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes CD, laser disc, optical disc, digital versatile disc (DVD), and floppy disk, where disks usually reproduce data magnetically, while discs reproduce data optically with lasers. Combinations of the above should also be included within the scope of computer-readable media.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous disclosure is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for compensating for parallax in an image displayed on a display of a head-worn device (HWD), the method comprising:
    determining locations of one or more landmarks in a geographic space relative to a location of a user of the HWD based on first information indicative of the geographic space;
    generating a map of the one or more landmarks in the geographic space;
    receiving second information indicative of the geographic space;
    orienting the second information indicative of the geographic space relative to the map;

shifting at least a portion of the second information indicative of the geographic space to produce modified image data; and projecting the modified image data onto a screen of the HWD, wherein the one or more landmarks are sparsely distributed relative to an amount of objects in the geographic space.

2. The method of claim 1, wherein the map includes distance data of the one or more landmarks and the shifting is based on the distance data of the one or more landmarks.

3. The method of claim 1, wherein the second information is determined by a detector mounted above the display, and wherein the modified image data is configured to overlie the geographic space as viewed by the user through the display.

4. The method of claim 1, wherein the second information is determined by a night vision camera.

5. The method of claim 1, wherein the second information is determined by an infrared sensor.

6. The method of claim 1, wherein the modified image data corresponds to a portion of the geographic space within 30 meters or less from the user of the HWD.

7. The method of claim 1, wherein the first information is determined by an optical-inertial tracker.

8. The method of claim 1, wherein the first information indicative of the geographic space and the second information indicative of the geographic space are captured by a single camera.

9. A system for compensating for parallax in an image displayed on a display of a head-worn device (HWD), the system comprising:
a first detector configured to determine first information indicative of a geographic space;
and second information indicative of a geographic space;
the display; and
a computing system including a processor and a memory, the memory including instructions executable by the processor to:
determine locations of one or more landmarks in a geographic space relative to a location of a user of the HWD based on the first information indicative of the geographic space;
generate a map of the one or more landmarks in the geographic space;
orient the second information indicative of the geographic space relative to the map;
shift at least a portion of the second information indicative of the geographic space to produce modified image data; and
project the modified image data onto the display,
wherein the one or more landmarks are sparsely distributed relative to an amount of objects in the geographic space.

10. The system of claim 9, wherein the map includes distance data of the one or more landmarks and the shifting is based on the distance data of the one or more landmarks.

11. The system of claim 9, wherein a second detector is mounted above the display, and wherein the modified image data is configured to overlie the geographic space as viewed by the user through the display.

12. The system of claim 9, further comprising a second detector that is a night vision camera.

13. The system of claim 9, further comprising a second detector that is an infrared sensor.

14. The system of claim 9, wherein the modified image data corresponds to a portion of the geographic space within 30 meters or less from the user of the HWD.

15. The system of claim 9, wherein the first detector is an optical-inertial tracker.

16. A method for compensating for parallax in an image displayed on a display of a head-worn device (HWD), the method comprising:
determining locations of one or more landmarks in a geographic space relative to a location of a user of the HWD based on first information indicative of the geographic space determined by a detector;
generating a map of the one or more landmarks in the geographic space;
shifting at least a portion of the first information indicative of the geographic space determined by the detector to produce modified image data; and
projecting the modified image data onto a screen of the HWD,
wherein the one or more landmarks are sparsely distributed relative to an amount of objects in the geographic space.

17. The method of claim 16, wherein the detector is an optical-inertial tracker.

18. The method of claim 16, wherein the map includes distance data of the one or more landmarks and the shifting is based on the distance data of the one or more landmarks.

19. The method of claim 16, wherein the detector is mounted above the display, and wherein the modified image data is configured to overlie the geographic space as viewed by the user through the display.

20. The method of claim 16, wherein the modified image data corresponds to a portion of the geographic space within 30 meters or less from the user of the HWD.

* * * * *